United States Patent
Yun et al.

(10) Patent No.: US 12,181,909 B2
(45) Date of Patent: Dec. 31, 2024

(54) OPTICAL COMPUTING DEVICE AND COMPUTING METHOD

(71) Applicant: Huawei Technologies Co., Ltd., Shenzhen (CN)

(72) Inventors: Zhiqiang Yun, Shenzhen (CN); Xiang Zhang, Shenzhen (CN); Xiaowen Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 507 days.

(21) Appl. No.: 17/691,945

(22) Filed: Mar. 10, 2022

(65) Prior Publication Data

US 2022/0197328 A1    Jun. 23, 2022

Related U.S. Application Data

(63) Continuation of application No. PCT/CN2020/114614, filed on Sep. 10, 2020.

(30) Foreign Application Priority Data

Sep. 11, 2019   (CN) .......................... 201910860799.4

(51) Int. Cl.
 *G06E 3/00*   (2006.01)
(52) U.S. Cl.
 CPC .................................. *G06E 3/008* (2013.01)
(58) Field of Classification Search
 None
 See application file for complete search history.

(56) References Cited

U.S. PATENT DOCUMENTS

| | | | |
|---|---|---|---|
| 2009/0059331 A1* | 3/2009 | Bogoni | G02F 3/00 359/108 |
| 2014/0200689 A1 | 7/2014 | Utsunomiya et al. | |

(Continued)

FOREIGN PATENT DOCUMENTS

| | | |
|---|---|---|
| CN | 109564639 A | 4/2019 |
| CN | 109814319 B | 8/2020 |

(Continued)

OTHER PUBLICATIONS

Clements et al., "Optimal design for universal multiport interferometers," Optica, vol. 3, No. 12, pp. 1460-1465, The Optical Society (Dec. 2016).

(Continued)

*Primary Examiner* — Jennifer D. Carruth
(74) *Attorney, Agent, or Firm* — Leydig, Voit & Mayer, Ltd.

(57) ABSTRACT

An optical computing device and a computing method are provided for an optical Ising machine with high operation efficiency. The optical computing device includes a first spin array, an optical feedback network, and a second spin array, where the optical feedback network is separately connected to the first spin array and the second spin array. The first spin array may receive a first group of signals including N optical pulses or N electrical signals, and generate a first group of spin signals including N spin signals. The optical feedback network may receive the first group of spin signals, and generate, based on the first group of spin signals and specified first data, a first group of feedback signals including N feedback signals. The first spin array and the second spin array may process a plurality of signals in parallel, to improve computation efficiency of the optical computing device.

17 Claims, 12 Drawing Sheets

(56) References Cited

U.S. PATENT DOCUMENTS

| | | |
|---|---|---|
| 2017/0024658 A1 | 1/2017 | Utsunomiya et al. |
| 2018/0267937 A1 | 9/2018 | Pelc et al. |
| 2019/0019100 A1 | 1/2019 | Roques-Carmes et al. |

FOREIGN PATENT DOCUMENTS

| | | | |
|---|---|---|---|
| JP | 2015163922 A | | 9/2015 |
| JP | 2018147225 A | | 9/2018 |
| JP | 2018147226 A | | 9/2018 |
| JP | 2019078777 A | | 5/2019 |
| WO | 2019014345 A1 | | 1/2019 |
| WO | 2019078354 A1 | | 4/2019 |
| WO | 2019078355 A1 | | 4/2019 |

OTHER PUBLICATIONS

Mcmahon et al., "A fully-programmable 100-spin coherent Ising machine with all-to-all connections," Science, Reports, Total 9 pages, American Association for the Advancement of Science, Washington, DC (Nov. 2016).

* cited by examiner

| Optical signal matrix | Two-dimensional matrix | Feedback signal array |

FIG. 10

| $a_{1,1}E_1$ | $a_{1,2}E_2$ | $a_{1,3}E_3$ | ... | $a_{1,N}E_N$ |
| --- | --- | --- | --- | --- |
| $a_{2,1}E_1$ | $a_{2,2}E_2$ | $a_{2,3}E_3$ | ... | $a_{2,N}E_N$ |
| $a_{3,1}E_1$ | $a_{3,2}E_2$ | $a_{3,3}E_3$ | ... | $a_{3,N}E_N$ |
| ... | ... | ... | ... | ... |
| $a_{N,1}E_1$ | $a_{N,2}E_2$ | $a_{N,3}E_3$ | ... | $a_{N,N}E_N$ |

OPTICAL COMPUTING DEVICE AND COMPUTING METHOD

CROSS-REFERENCE TO RELATED APPLICATIONS

This application is a continuation of International Application No. PCT/CN2020/114614, filed on Sep. 10, 2020, which claims priority to Chinese Patent Application No. 201910860799.4, filed on Sep. 11, 2019. The disclosures of the aforementioned applications are hereby incorporated by reference in their entireties.

TECHNICAL FIELD

Embodiments of this application relate to the field of information technologies, and in particular, to an optical computing device and a computing method.

BACKGROUND

Combinatorial optimization problems in many fields such as drug design, transport physical planning, and network resource allocation are non-deterministic polynomial time-hard (NP-hard) problems, and are difficult to solve within an appropriate time period because solving time of the combinatorial optimization problems increases exponentially with quantities of variables in the problems. The combinatorial optimization problems can be first transformed into an Ising model, and the Ising model is simulated and solved by an optical Ising machine.

The Ising model describes a stochastic process that represents phase transitions of substances at N nodes in a magnetic structure. One of the N nodes represents a magnetic dipole, and the magnetic dipole has a spin state of +1 or −1. Each node may interact with many other nodes, to generate the phase transition of the substance (for example, a spin state changes).

The optical Ising machine simulates and solves the Ising model by using a physical phenomenon that a plurality of optical signals (or optical pulses) form a lattice network. In the optical Ising machine, phases of the optical signals (or the optical pulses) are used to represent spin states of nodes in the Ising model, and the optical signals or the optical pulses are coupled to and interfered with each other, to change the phases of the optical signals (or the optical pulses).

Currently, the optical signals in an implementation solution of the optical Ising machine generally run in series. As a quantity of nodes in the Ising model increases, more optical signals need to be introduced, and an increase in a quantity of optical signals results in an increase in transmission time of the optical signals in the optical Ising machine. Consequently, operation time is greatly increased, and operation efficiency of the optical Ising machine is limited.

SUMMARY

This application provides an optical computing device and a computing method, to provide an optical Ising machine with high operation efficiency, and improve a computation speed.

According to a first aspect, this application provides an optical computing device. The device includes a first spin array, an optical feedback network, and a second spin array, where the optical feedback network is separately connected to the first spin array and the second spin array. The first spin array may receive a first group of signals, and generate a first group of spin signals based on the first group of signals. The first group of spin signals includes N spin signals, and N is an integer not less than 2. The first spin array may send the first group of spin signals to the optical feedback network. After receiving the first group of spin signals, the optical feedback network may generate a first group of feedback signals based on the first group of spin signals and specified first data, where the first group of feedback signals includes N feedback signals. The optical feedback network may send the first group of feedback signals to the second spin array. In addition to receiving the first group of feedback signals, the second spin array may further receive the first group of signals. The second spin array may generate a second group of spin signals based on the first group of feedback signals and the first group of signals, where the second group of spin signals includes N spin signals.

A group of spin signals generated by the first spin array or the second spin array each time can indicate an intermediate computation result in a procedure in which the optical computing device processes an optical signal. When phases of a group of spin signals generated by the first spin array or the second spin array reach preset values, the group of spin signals may indicate a final computation result of the procedure in which the optical computing device processes the optical signal.

In the optical computing device provided in this application, the first spin array and the second spin array receive the same group of signals, and the first spin array may send the feedback signals to the second spin array through the optical feedback network, so that the second spin array may also generate a group of spin signals. Procedures in which the first spin array and the second spin array process signals in a group of signals are parallel. Therefore, when a quantity of signals is increased, operation time of the optical computing device is not increased, and therefore computation efficiency of the optical computing device can be effectively improved.

In a possible design, the second spin array may send the second group of spin signals to the optical feedback network. The optical feedback network receives the second group of spin signals, and may further generate a second group of feedback signals based on the second group of spin signals and the first data, where the second group of feedback signals includes N feedback signals. When receiving the second group of feedback signals, the first spin array may further receive a second group of signals. The first spin array may further generate a third group of spin signals based on the second group of feedback signals and the second group of signals, where the third group of spin signals includes N spin signals.

In the optical computing device provided in this application, the first spin array and the second spin array are coupled to each other through the optical feedback network to establish a connection. In this connection manner, a structure of the optical computing device is simplified. The first spin array and the second spin array can receive the same group of signals, and the spin arrays may process the group of signals in parallel, and send the feedback signals to each other through the optical feedback network. A procedure of transmitting a signal between the first spin array and the second spin array through the optical feedback network is simpler and more efficient, so that the computation efficiency of the optical computing device is improved. In addition, in the manner in which the first spin array and the second spin array send the feedback signals to each other through the optical feedback network, phase interlocking of the spin signals generated by the first spin array and the second spin array can be implemented. In addition, in the optical computing device provided in this application, because the first spin array and the second spin array are coupled to each other through the optical feedback network to establish the connection, the first spin array and the second spin array inject the feedback signals to each other through the optical feedback network. A plurality of feedback signals are injected at the same time, but a fiber length does not need to be increased. This can effectively reduce signal transmission time, reduce computation time of the optical computing device, and help improve operation efficiency of the optical computing device.

In a possible design, the first spin array includes N optical parametric oscillators, and each optical parametric oscillator in the first spin array may receive one of the first group of signals.

In the optical computing device provided in this application, the N optical parametric oscillators included in the first spin array can process a plurality of signals in the first group of signals in parallel, and each optical parametric oscillator can generate one spin signal. In a manner in which the first spin array processes the first group of signals in parallel, the operation time of the optical computing device can be effectively shortened, signal processing efficiency of the first spin array can be effectively improved. Further, it can be ensured that a computation procedure of the optical computing device is efficiently performed.

In a possible design, the second spin array includes N optical parametric oscillators, and each optical parametric oscillator in the second spin array may receive one of the first group of signals, and may further receive one of the first group of feedback signals. The signal and the feedback signal that are received by each optical parametric oscillator interact in the optical parametric oscillator. There is a one-to-one correspondence between the N optical parametric oscillators in the second spin array and the N optical parametric oscillators in the first spin array, and signals received by optical parametric oscillators that have a correspondence in the second spin array and the first spin array are the same.

In the optical computing device provided in this application, the N optical parametric oscillators included in the second spin array can process the N feedback signals and a plurality of signals in a group of signals in parallel, and each optical parametric oscillator can generate one spin signal. In a manner in which the second spin array processes the plurality of signals in the group of signals in parallel, signal processing efficiency of the second spin array can be improved, and it can be ensured that a computation procedure of the optical computing device is efficiently performed. Further, the correspondence between the optical parametric oscillators in the second spin array and the optical parametric oscillators in the first spin array can ensure that each optical parametric oscillator in the first spin array and a corresponding optical parametric oscillator in the second spin array receive a same optical pulse.

In a possible design, the optical feedback network includes a first signal processing module, a problem loading module, and a second signal processing module. The problem loading module is separately connected to the first signal processing module and the second signal processing module.

The first signal processing module may receive the first group of spin signals, and the first signal processing module may convert the first group of spin signals into a first optical signal matrix, where the first optical signal matrix includes N×N optical pulses. The first signal processing module may transmit the first optical signal matrix to the problem loading module, and the problem loading module may generate a first feedback signal matrix based on the first optical signal matrix and the first data, where the first feedback signal matrix includes N×N optical signals. Then, the second signal processing module may convert the first feedback signal matrix into the first group of feedback signals.

In the optical computing device provided in this application, when signal processing is performed inside the optical feedback network, optical-to-electrical conversion does not need to be performed, and a group of spin signals may be converted into a group of feedback signals. In this way, the computation time can be effectively shortened, and the computation efficiency of the optical computing device can further be improved.

In a possible design, the second signal processing module may further receive the second group of spin signals, and convert the second group of spin signals into a second optical signal matrix, where the second optical signal matrix includes N×N optical pulses. The second signal processing module may send the second optical signal matrix to the problem loading module. Then, the problem loading module may generate a second feedback signal matrix based on the second optical signal matrix and the first data, where the second feedback signal matrix includes N×N optical signals. The problem loading module may send the second feedback signal matrix to the first signal processing module, and the first signal processing module may convert the second feedback signal matrix into the second group of feedback signals.

In the optical computing device provided in this application, when signal processing is performed inside the optical feedback network, optical-to-electrical conversion does not need to be performed, and a group of spin signals may be converted into a group of feedback signals. In this way, the computation time can be effectively shortened, and the computation efficiency of the optical computing device can further be improved.

In a possible design, the optical feedback network may include a plurality of cascaded Mach-Zehnder interferometer units, and each Mach-Zehnder interferometer unit includes a Mach-Zehnder interferometer and an optical switch disposed at an interval.

In the optical computing device provided in this application, sizes of the Mach-Zehnder interferometer units are small, and the optical computing device having a compact structure can be formed, so that the optical computing device can be implemented on a chip, to ensure system stability.

In a possible design, the optical computing device further includes a detector array, and the detector array may be connected to any spin array. When being connected to the first spin array, the detector array may detect the third group of spin signals, and when phases of the third group of spin signals are the preset values, the detector array obtains a computation result of the first data based on the third group of spin signals.

In the optical computing device provided in this application, the detector array can conveniently determine a final output result by detecting phases of a group of spin signals generated by the first spin array.

In a possible implementation, a group of signals (for example, the first group of signals or the second group of signals) received by the first spin array and the second spin array may include a plurality of optical pulses or a plurality of electrical signals, where an optical pulse or an electrical signal may be referred to as a signal in the group of signals. For example, a quantity of the optical pulses or the electrical signals may be N. When the group of signals received by the first spin array and the second spin array includes a plurality of electrical signals, the first spin array and the second spin array may convert the plurality of electrical signals into a group of optical pulses. The group of optical pulses includes N optical pulses.

For example, the first group of signals includes a first group of optical pulses, the second group of signals includes a second group of optical pulses, and an amplitude of the second group of optical pulses is greater than an amplitude of the first group of optical pulses.

In the optical computing device provided in this application, the first spin array and the second spin array may directly process the optical pulses, or may perform optical-to-electrical conversion, and then process converted optical pulses. This is applicable to different application scenarios, and extends an application range.

According to a second aspect, this application provides a computing method. For beneficial effects, refer to related descriptions in the first aspect. Details are not described herein again. The method is performed by an optical computing device, and the optical computing device includes a first spin array, a second spin array, and an optical feedback network that is separately connected to the first spin array and the second spin array. The method includes: The first spin array first receives a first group of signals, and generates a first group of spin signals based on the first group of signals. The first group of spin signals includes N spin signals, and N is an integer not less than 2. The first spin array sends the first group of spin signals to the optical feedback network.

After receiving the first group of spin signals, the optical feedback network generates a first group of feedback signals based on the first group of spin signals and specified first data, where the first group of feedback signals includes N feedback signals. The optical feedback network sends the first group of feedback signals to the second spin array.

The second spin array receives the first group of signals and the first group of feedback signals, and may generate a second group of spin signals based on the first group of feedback signals and the first group of signals, where the second group of spin signals includes N spin signals.

In a possible design, the second spin array may send the second group of spin signals to the optical feedback network. After receiving the second group of spin signals sent by the second spin array, the optical feedback network may generate a second group of feedback signals based on the second group of spin signals and the first data, where the second group of feedback signals includes N feedback signals. The optical feedback network may send the second group of feedback signals to the first spin array.

The first spin array may further receive a second group of signals.

The first spin array generates a third group of spin signals based on the received second group of feedback signals and the received second group of signals, where the third group of spin signals includes N spin signals.

In a possible design, the optical computing device further includes a detector array. The detector array can detect the third group of spin signals, and determine a phase of each spin signal in the third group of spin signals.

When the phases of the third group of spin signals are preset values, the detector array may obtain a computation result of the first data based on the third group of spin signals.

In a possible design, when the first spin array receives the first group of signals, each optical parametric oscillator in the first spin array can receive one of the first group of signals.

In a possible design, the second spin array includes N optical parametric oscillators, and when the second spin array receives the first group of signals and the first group of feedback signals, each optical parametric oscillator in the second spin array may receive one of the first group of signals and one of the first group of feedback signals. The N optical parametric oscillators in the second spin array are in a one-to-one correspondence with N optical parametric oscillators in the first spin array, and optical pulses received by optical parametric oscillators that have a correspondence in the second spin array and the first spin array are the same.

According to a third aspect, this application provides an optical computing chip. The optical computing chip may include the optical computing device according to any one of the first aspect or the possible implementations of the first aspect.

BRIEF DESCRIPTION OF DRAWINGS

FIG. 10 is a flowchart of processing a signal by a problem loading module according to this application:

DESCRIPTION OF EMBODIMENTS

This application provides a computing method and an optical computing device, to provide an optical Ising machine with high operation efficiency.

Figure 1:
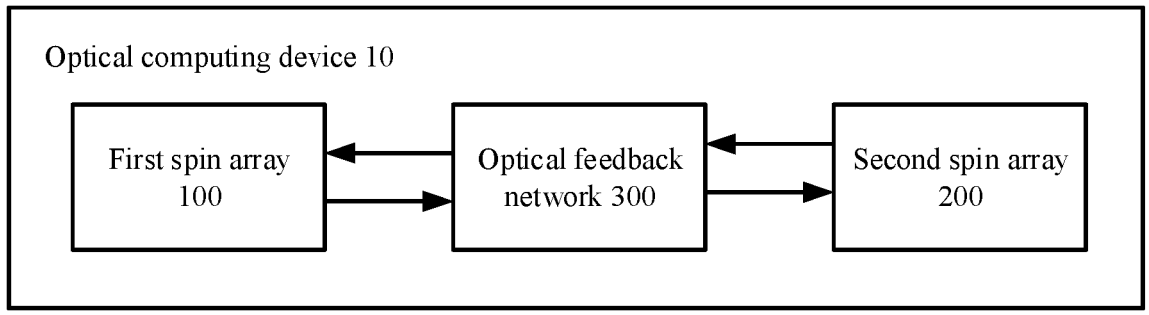
FIG. 1 is a schematic diagram of a structure of an optical computing device according to this application.

FIG. 1 shows an optical computing device according to an embodiment of this application. An optical computing device 10 includes two spin arrays and an optical feedback network 300. The two spin arrays are respectively a first spin array 100 and a second spin array 200 for distinction, and the optical feedback network 300 is separately connected to the first spin array 100 and the second spin array 200.

The spin array (the first spin array 100 or the second spin array 200) in this embodiment of this application can receive a group of signals (and a plurality of feedback signals fed back by the optical feedback network 300), and generate a plurality of spin signals based on the received group of signals (and the received plurality of feedback signals).

A type of a signal included in the group of signals received by the spin array is not limited in this embodiment of this application. The group of signals may include a plurality of optical pulses or a plurality of electrical signals (for example, electrical pulses). For example, quantities of the optical pulses and the electrical signals may be N. When receiving a group of electrical signals (including N electrical signals), the spin array can convert the received group of electrical signals into N optical pulses. After the electrical signals are converted into N optical pulses, the spin array may generate N spin signals based on the N optical pulses (and N feedback signals). In this embodiment of this application, an example in which the signals received by the spin array is a group of optical pulses is merely used for description, and the group of optical pulses includes N optical pulses.

The optical feedback network 300 can receive a plurality of spin signals generated by a spin array: process, based on preset first data, the plurality of spin signals generated by the spin array 100, to generate a plurality of feedback signals; and feed back the generated plurality of feedback signals to another spin array.

In this embodiment of this application, an example in which a group of signals received by the first spin array 100 (or the second spin array 200) is a group of optical pulses including N optical pulses is used for description. A case in which a group of signals received by the first spin array 100 (or the second spin array 200) is a group of electrical signals (including N electrical signals) is similar to a case in which the group of signals received by the first spin array 100 (or the second spin array 200) is the group of optical pulses including the N optical pulses, and a difference lies in that, when the group of signals received by the first spin array 100 (or the second spin array 200) includes N electrical signals, the first spin array 100 (or the second spin array 200) needs to first convert the N electrical signals into N optical pulses. A manner of subsequently processing the N optical pulses is the same as a manner of processing the N optical pulses when the first spin array 100 (or the second spin array 200) receives the group of optical pulses.

The following describes a signal transmission procedure between the first spin array 100, the optical feedback network 300, and the second spin array 200. Signal transmission between the first spin array 100, the optical feedback network 300, and the second spin array 200 may include two procedures based on signal transmission directions: signal transmission (a procedure 1) in which the spin signal generated by the first spin array 100 arrives at the second spin array 200 through the optical feedback network 300, and signal transmission (a procedure 2) in which the spin signal generated by the second spin array 200 arrives at the first spin array 100 through the optical feedback network 300.

The procedure 1 is a signal transmission procedure in which the spin signal generated by the first spin array 100 arrives at the second spin array 200 through the optical feedback network 300.

Figure 2:
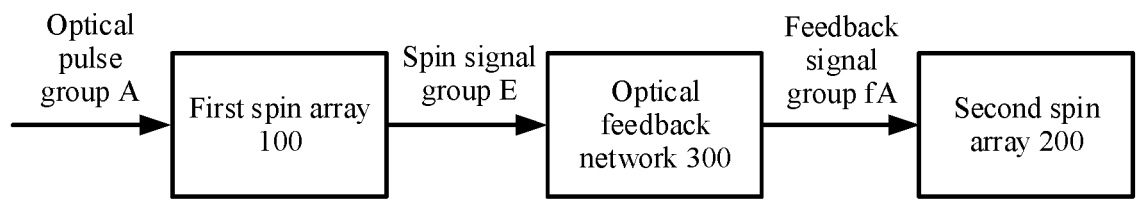
FIG. 2 is a flowchart of signal transmission in an optical computing device according to this application.

As shown in FIG. 2, the first spin array 100 may receive a group of optical pulses (for ease of description, the group of optical pulses received by the first spin array 100 is represented by an optical pulse group A), and the optical pulse group A includes a plurality of same optical pulses: $A_1$, $A_2$, $A_3$, ..., $A_N$.

The first spin array 100 may generate a group of spin signals based on the optical pulse group A (for easy of description, the group of spin signals is represented by a spin signal group E), where a plurality of spin signals in the spin signal group E are respectively $E_1$, $E_2$, $E_3$, ..., and $E_N$; and then input the spin signal group E to the optical feedback network 300.

After receiving the spin signal group E, the optical feedback network 300 processes the spin signal group E by using the preset first data, to generate a group of feedback signals (for ease of description, the group of feedback signals is represented by a feedback signal group fA), where the feedback signal group fA includes a plurality of feedback signals: $fA_1$, $fA_2$, ... and $fA_N$; and inputs the feedback signal group fA to the second spin array 200.

The procedure 2 is a signal transmission procedure in which the spin signal generated by the second spin array 200 arrives at the first spin array 100 through the optical feedback network 300.

Figure 3:
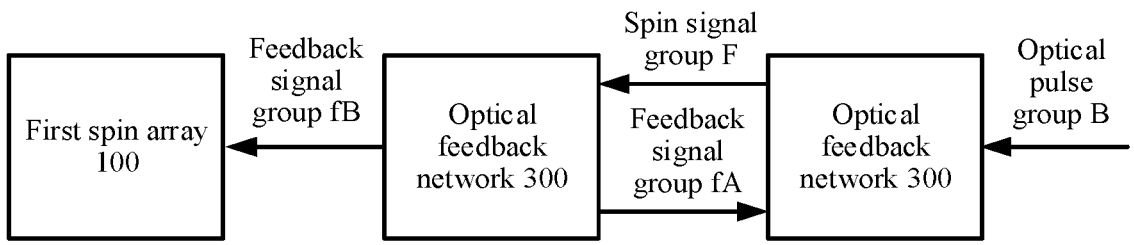
FIG. 3 is another flowchart of signal transmission in an optical computing device according to this application.

As shown in FIG. 3, in addition to receiving the feedback signal group fA, the second spin array 200 may further receive a group of optical pulses that is the same as the optical pulse group A. To distinguish different spin arrays receiving optical pulse groups, the group of optical pulses, received by the second spin array 200, that is the same as the optical pulse group A is represented by an optical pulse group B, and the optical pulse group B includes a plurality of optical pulses: $B_1$, $B_2$, $B_3$, ..., and $B_N$. $B_1$ and $A_1$ are same optical pulses, $B_2$ and $A_2$ are same optical pulses, $B_3$ and $A_3$ are same optical pulses, and $B_N$ and $A_N$ are same optical pulses.

The second spin array 200 generates a group of spin signals based on the feedback signal group fA and the optical pulse group B (for easy of description, the group of spin signals is represented by a spin signal group F), where a plurality of spin signals in the spin signal group F are respectively $F_1$, $F_2$, $F_3$, ..., and $F_N$; and then inputs the spin signal group F to the optical feedback network 300.

The optical feedback network 300 processes the spin signal group F by using the preset first data, to generate a group of feedback signals (for ease of description, the group of feedback signals is represented by a feedback signal group fB), where the feedback signal group fB includes a plurality of feedback signals: $fB_1$, $fB_2$, ..., and $fB_N$; and inputs the feedback signal group fB to the first spin array 100.

In the procedure 1 and the procedure 2, the first spin array and the second spin array may send the feedback signals to each other through the optical feedback network 300, to achieve an effect of phase interlocking of the spin signals generated by the first spin array and the second spin array.

Procedures in which the first spin array 100 and the second spin array 200 process optical pulses in a group of optical pulses are parallel, so that operation time of the optical computing device 10 can be effectively reduced. Even if a quantity of optical pulses is increased, the operation time of the optical computing device is not increased. This effectively ensures computation efficiency of the optical computing device.

After receiving the optical pulse group A, the first spin array 100 further receives another group of optical pulses. For example, a subsequently received group of optical pulses is an optical pulse group A'. After receiving the optical pulse group A', the first spin array 100 generates a group of spin signals based on the feedback signal group fB and the optical pulse group A' (for ease of description, the group of spin signals is represented by a spin signal group P), where a plurality of spin signals in the spin signal group P are respectively $P_1, P_2, P_3 \ldots$ and $P_N$. The first spin array 100 inputs the spin signal group P to the optical feedback network 300, and the optical feedback network 300 may generate a group of feedback signals based on the spin signal group P and the preset first data (for ease of description, the group of feedback signals is represented by a feedback signal group fA'), where the feedback signal group fA' includes a plurality of feedback signals; and inputs the feedback signal group fA' to the second spin array 200. This procedure is similar to the procedure 1, and a difference lies in that the first spin array 100 generates the group of spin signals based on the subsequently received optical pulse group and the plurality of feedback signals generated by the optical feedback network 300.

The second spin array 200 may further receive a group of optical pulses (which may be represented by an optical pulse group B') that is the same as the optical pulse group A', and generate a group of spin signals by using the optical pulse group B' and the feedback signal group fA' input by the optical feedback network 300 (for ease of description, the group of spin signals is represented by a spin signal group Q), where a plurality of spin signals in the spin signal group Q are respectively $Q_1, Q_2, Q_3, \ldots$, and QN. The second spin array 200 inputs the spin signal group Q to the optical feedback network 300. The optical feedback network 300 may generate a group of feedback signals based on the spin signal group and the preset first data (for ease of description, the group of feedback signals is represented by a feedback signal group fB'), where the feedback signal group fB' includes a plurality of feedback signals; and input the feedback signal group fB' to the first spin array 100. This procedure is similar to the procedure 2, and a difference lies in that the signals (the optical pulses and the feedback signals) received by second spin array 200 are different.

The first spin array 100 and the second spin array 200 in the optical computing device further continue to receive a same optical pulse group subsequently, and perform signal transmission procedures similar to the foregoing procedures. In other words, each time the first spin array 100 and the second spin array 200 in the optical computing device receive a same group of optical pulses, the first spin array 100 and the second spin array 200 perform once the signal transmission procedures similar to the foregoing procedures.

A group of spin signals generated by the first spin array 100 or the second spin array 200 in a signal processing procedure similar to the procedure 1 and the procedure 2 indicates an intermediate computation result of the optical computing device 10. Until phases of N spin signals in a group of spin signals generated by the first spin array 100 or the second spin array 200 collapse to 0 or $\pi$, the group of spin signals may indicate a final computation result.

It should be understood that, when the signal transmission procedures similar to the procedure 1 and the procedure 2 are cycled once inside the optical computing device, groups of optical pulses received by the first spin array 100 and the second spin array 200 are the same (for example, the optical pulse group A is the same as the optical pulse group B. and the optical pulse group A' is the same as the optical pulse group B'). In an implementation, each group of optical pulses received by the first spin array 100 and the second spin array 200 may be sent by a same pump source. After the pump source sends a group of optical pulses, the group of optical pulses may be divided into two same groups of optical pulses through splitting, and the two same groups of optical pulses are respectively sent to the first spin array 100 and the second spin array 200. In another implementation, each group of optical pulses received by the first spin array 100 and the second spin array 200 may be sent by a same pump source. When the first spin array 100 and the second spin array 200 cycle once the signal transmission procedures similar to the procedure 1 and the procedure 2 each time, the pump source may send two same groups of optical pulses at a specified time interval, where one group of optical pulses is sent to the first spin array 100, and the other group of optical pulses is sent to the second spin array 200. For example, the pump source may generate one group of optical pulses at a time interval T/2, and generate two same groups of optical pulses within time T. Optical pulses generated within different time T may be different.

In another implementation, each group of optical pulses received by the first spin array 100 and the second spin array 200 may alternatively be sent by two different pump sources, but two groups of optical pulses sent by the two different pump sources are the same.

In addition, one spin array (for example, the second spin array 200) needs to generate a group of spin signals based on a received group of optical pulses and a group of feedback signals received from the optical feedback network 300. The group of feedback signals received by the second spin array 200 are generated by the optical feedback network 300 by using the same group of optical pulses (and another group of feedback signals) based on the first spin array 100. To be specific, time at which the second spin array 200 receives the group of optical pulses needs to be later than time at which the first spin array 100 receives the same group of optical pulses. In this way, the second spin array 200 can obtain the group of feedback signals from the optical feedback network 300 when receiving the group of optical pulses.

In other words, although the two spin arrays receive the same group of optical pulses, the time at which the group of optical pulses arrive at the two spin arrays is different, and a time difference exists. The time difference may enable the second spin array 200 to receive the group of optical pulses and a group of feedback signals at the same time. The time difference is determined based on a time period from receiving the group of optical pulses by the first spin array 100 to feeding back a group of feedback signals by the optical feedback network 300 to the second spin array 200, and is related to a time period during which a group of optical pulses are processed in the optical computing device to generate corresponding feedback signals.

For example, each group of optical pulses received by the first spin array 100 and the second spin array 200 may be sent by the same pump source. If a period of sending each group of optical pulses by the pump source is T, that is, the pump source generates one group of optical pulses at an interval T, after one group of optical pulses sent by the pump source is split, a difference between time at which the group of optical pulses arrives at the first spin array 100 and time at which the group of optical pulses arrives at the second spin array 200 may be set to T/2.

Figure 4:
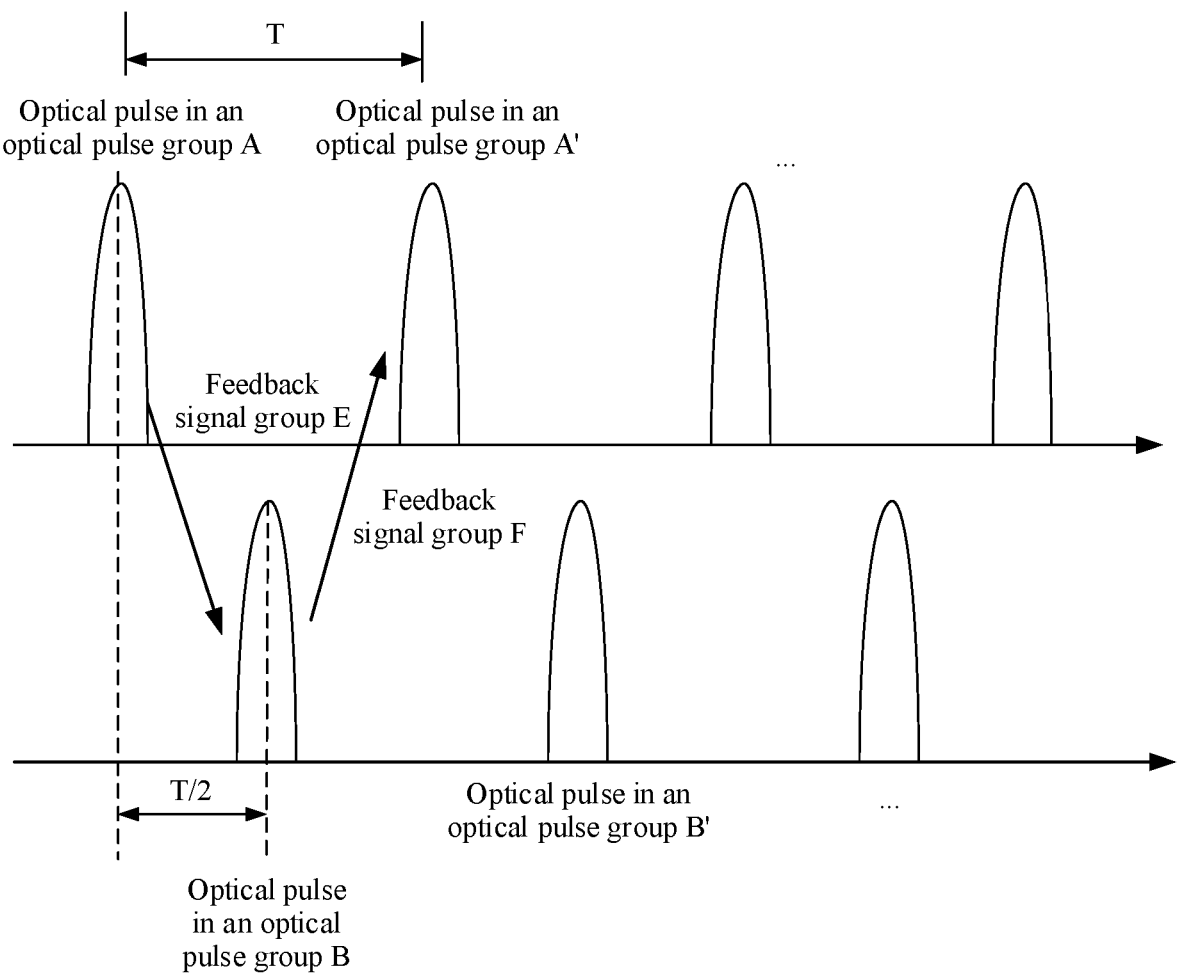
FIG. 4 is a schematic diagram of optical pulse groups received by two spin arrays according to this application.

FIG. 4 is a schematic diagram of optical pulse groups received by two spin arrays. The first spin array 100 generates the spin signals by using the optical pulse group A. The spin signals are processed by using optical feedback networks to generate the feedback signal group E, and the feedback signal group E is injected into the second spin array 200.

The second spin array 200 generates new spin signals by using the received optical pulse group B and the feedback signal group E. The new spin signals are processed by using the optical feedback signals to generate the feedback signal group F, and the feedback signal group F is injected into the first spin array 100. In this way, cyclic superposition is performed.

The pump source may adjust one group of optical pulses generated each time. For example, the pump source may increase an amplitude of each optical pulse in the group of optical pulses to generate a group of optical pulses different from the group of optical pulses generated before T, and separately input the generated optical pulse group into the first spin array 100 and the second spin array 200. In this way, the first spin array 100, the second spin array 200, and the optical feedback network 300 in the optical computing device can change, based on the optical pulse group generated by the pump source, a group of spin signals generated by the second spin array 200.

The first spin array 100 and the second spin array 200 continue to receive a same group of optical pulses, perform the foregoing procedures, and send feedback signals to each other through the optical feedback network 300. In this embodiment of this application, because the first spin array 100 and the second spin array 200 are coupled through the optical feedback network 300 to establish a connection, and processing procedures of optical pulses in each group of optical pulses are parallel, the operation time of the optical computing device is not increased even if the quantity of optical pulses is increased, and the computation efficiency of the optical computing device can be effectively improved.

In the foregoing descriptions, the signal transmission procedures in the optical computing device are described. The following describes a manner of processing a signal by each component in the optical computing device.

(1). The first spin array 100 and the second spin array 200

Working principles of the first spin array 100 and the second spin array 200 are similar. Herein, only the second spin array 200 is used as an example for description.

Figure 5:
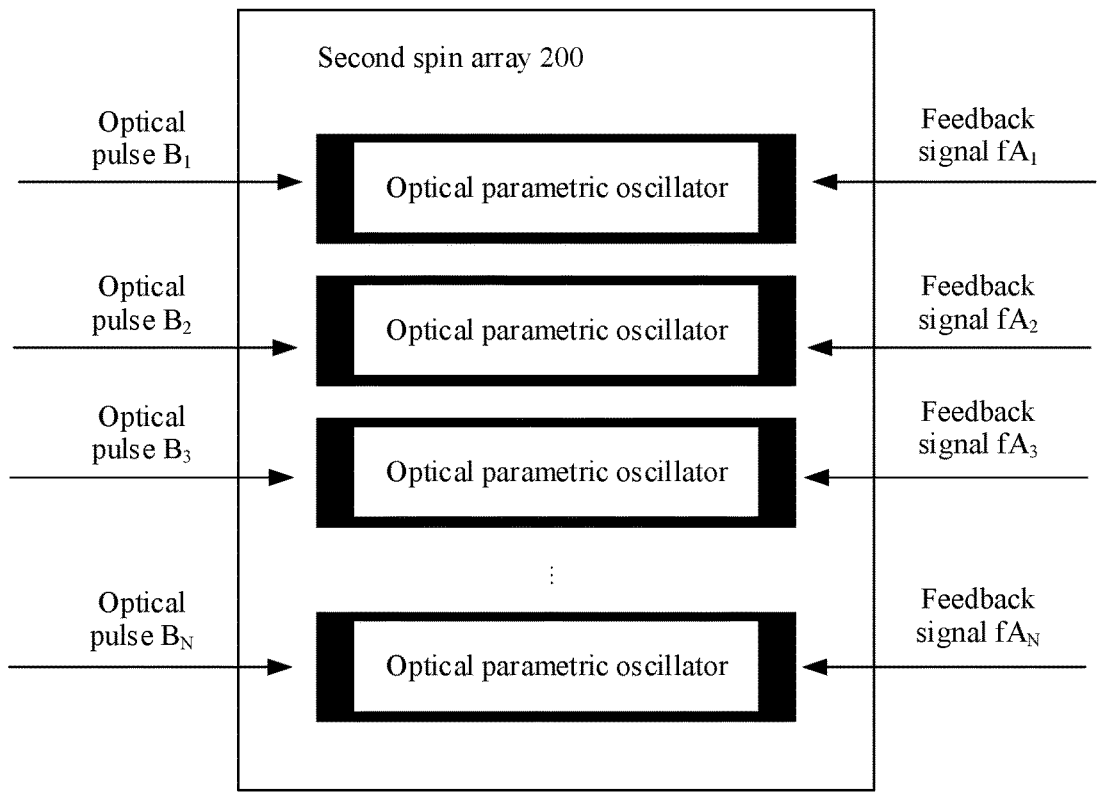
FIG. 5 is a schematic diagram of a structure of a second spin array according to this application.

As shown in FIG. 5, the second spin array 200 includes a plurality of parallel optical parametric oscillators, and a quantity of the optical parametric oscillators is the same as a quantity of the optical pulses included in a received group of optical pulses. Each optical parametric oscillator is connected to the optical feedback network 300, and receives one of a group of feedback signals from the optical feedback network 300. The optical parametric oscillator includes but is not limited to an optical parametric oscillator of an optical pump and an optical parametric oscillator of an electrical pump.

For example, a group of optical pulses received by the second spin array 200 is the optical pulse group B, the optical pulses in the optical pulse group B are respectively $B_1, B_2, B_3, \ldots,$ and $B_N$, and a quantity of the optical pulses is equal to N. The second spin array 200 includes N optical parametric oscillators, and each optical parametric oscillator may receive one optical pulse in the optical pulse group B. In this way, the N optical parametric oscillators may receive N optical pulses in the optical pulse group B. In this way, the second spin array 200 can process the N optical pulses in the optical pulse group B in parallel, to better improve signal processing efficiency.

The optical parametric oscillator (also referred to as an optical parametric oscillator) is a parametric oscillator that can oscillate based on a frequency of an optical signal (or an optical pulse). The optical parametric oscillator may generate a new optical signal (or optical pulse) through non-linear optical interaction based on an optical signal (or optical pulse) input to the optical parametric oscillator.

In this embodiment of this application, the second spin array 200 further receives the feedback signal group fA from the optical feedback network 300 when receiving the optical pulse group B. The optical feedback network 300 may separately input the plurality of feedback signals in the feedback signal group fA to the optical parametric oscillators in the second spin array 200, and each optical parametric oscillator receives one feedback signal. In other words, signals input to one optical parametric oscillator in the second spin array 200 include one optical pulse in the optical pulse group B and one feedback signal in the feedback signal group fA.

It should be understood that, because in the optical parametric oscillator, one feedback signal in the feedback signal group fA and one optical pulse need to interact, a time period for receiving the optical pulse and a time period for receiving the feedback signal by the optical parametric oscillator need to overlap. To ensure that the optical pulse and the feedback signal can interact in the optical parametric oscillator, a transmission path length of an optical signal in the optical feedback network 300, a transmission path of the optical pulse sent by the pump source, or a period of generating the optical pulse by the pump source may be adjusted. In this way, the optical pulse and the feedback signal can enter the optical parametric oscillator at the same time within a specified time period.

Figure 6:
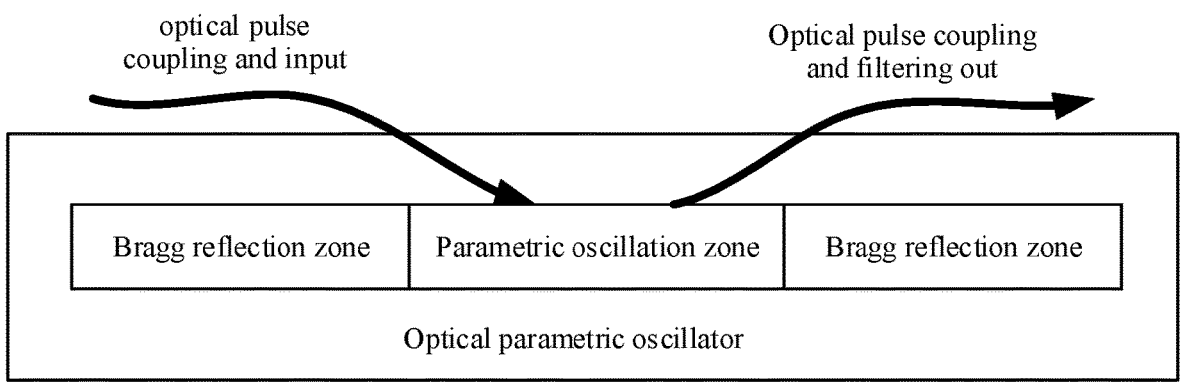
FIG. 6 is a schematic diagram of a structure of an optical parametric oscillator according to this application.

FIG. 6 is a schematic diagram of a structure of the optical parametric oscillator. The optical parametric oscillator includes two Bragg reflection zones and one parametric oscillation zone, where the Bragg reflection zones are located at two ends of the parametric oscillation zone. The two Bragg reflection zones form a resonant cavity. After entering the optical parametric oscillator, the feedback signal is transmitted back and forth between the two Bragg reflection zones for oscillation. The optical pulse is coupled and input to the parametric oscillation zone, and generates a nonlinear interaction with the feedback signal, and then the optical pulse is coupled and filtered out from the parametric oscillation zone. After the filtering out, an optical signal left in the optical parametric oscillator is a spin signal. In this embodiment of this application, because a phase of an optical signal output by the optical parametric oscillator may correspond to a spin state, the optical signal output by the optical parametric oscillator is referred to as a spin signal.

Each optical parametric oscillator in the second spin array 200 may generate one spin signal, and the second spin array 200 may output the spin signal group Q including N spin signals ($Q_1, Q_2, Q_3, \ldots,$ and $Q_N$).

Optical parametric oscillators included in the first spin array 100 and an interaction procedure of signals in each optical parametric oscillator are the same as the optical parametric oscillators included in the second spin array 200 and an interaction procedure of signals in each optical parametric oscillator. Details are not described herein again.

It should be noted that there is a one-to-one correspondence between the optical parametric oscillators in the second spin array 200 and the optical parametric oscillators in the first spin array 100. When the second spin array 200 and the first spin array 100 receive a same group of optical pulses, optical pulses received by two corresponding optical parametric oscillators in the second spin array 200 and the first spin array 100 are the same.

It should be understood that the example in which a group of signals received by the second spin array 200 includes N optical pulses is still used for description herein. A case in which a group of signals received by the second spin array 200 includes N electrical signals is similar to a case in which a group of signals received by the second spin array 200 includes N optical pulses. A difference lies in that, when the group of signals received by the second spin array 200 includes N electrical signals, the second spin array 200 needs to first convert the N electrical signals into N optical pulses. A procedure of processing the N optical pulses is the same as a manner of processing N optical pulses when the group of signals received by the second spin array 200 includes the N optical pulses. Specifically, inside the second spin array 200, each optical parametric oscillator receives one of the group of electrical signals, and converts the electrical signal into one optical pulse for processing. Then, each optical parametric oscillator generates one spin signal based on the optical pulse obtained through conversion and one received feedback signal. The manner in which each optical parametric oscillator generates the spin signal based on the optical pulse obtained through conversion and the received feedback signal is the same as a manner in which each optical parametric oscillator generates one spin signal based on one received optical pulse and one received feedback signal when the group of signals received by the second spin array 200 includes N optical pulses.

(2). The optical feedback network 300

In this embodiment of this application, the optical feedback network 300 may be or may not be an all-optical feedback network. All-optical feedback means that a procedure of generating a feedback signal is implemented by using an optical signal. Non-all-optical feedback means that a feedback signal may be generated in a form of a circuit or in a manner of photoelectric combined feedback. For example, when the non-all-optical feedback is used, a plurality of optical pulses may be first converted into electrical signals, and the electrical signals are loaded with feedback information by using a field programmable gate array (FPGA). A new optical signal is modulated (for example, changing a phase or intensity of the optical signal) based on the electrical signals loaded with the feedback information, and a modulated optical signal is a feedback signal. An implementation of the optical feedback network 300 is not limited in this embodiment of the present invention. It may be understood that, when the optical feedback network 300 is an all-optical feedback network, a group of feedback signals (essentially, the feedback signals are also optical signals) may be generated in a signal processing procedure of the optical feedback network 300 without using optical-to-electrical conversion, and the group of feedback signals is sent to the first spin array 100 or the second spin array 200. Because the optical-to-electrical conversion is omitted in the all-optical feedback network, the computation time can be effectively shortened, and signal processing efficiency of the optical feedback network 300 can be improved.

In this embodiment of this application, the optical feedback network 300 may process, based on the preset first data, a group of spin signals input by any spin array. The preset first data is related to a to-be-resolved NP-hard problem, and is obtained after the NP-hard problem is mathematically abstracted. For optical feedback networks 300 with different structures, a representation form of the first data is accordingly different. Embodiments of this application provide two types of optical feedback networks 300. The following separately describes the two types of optical feedback networks 300.

Figure 7:
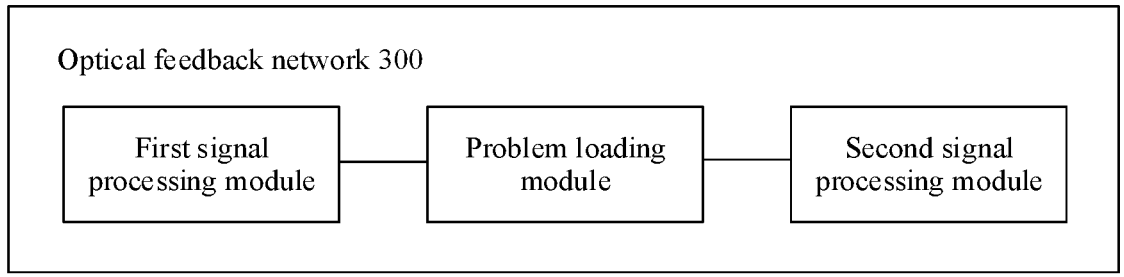
FIG. 7 is a schematic diagram of a structure of an optical feedback network according to this application.

As shown in FIG. 7, the optical feedback network 300 includes two signal processing modules (a first signal processing module and a second signal processing module) and a problem loading module. The first signal processing module receives each group of spin signals from the first spin array 100, and the second signal processing module receives each group of spin signals from the second spin array 200.

The signal processing module may convert a group of one-dimensional spin signals into a two-dimensional optical signal matrix, and may further convert a two-dimensional feedback signal matrix into a group of feedback signals. In other words, the signal processing module may increase a signal dimension, so that the problem loading module may perform processing subsequently; and may further reduce a signal dimension, to input a group of feedback signals to the spin arrays.

It should be noted that all signal matrices (for example, an optical signal matrix and a feedback signal matrix) in this embodiment of this application are matrices including N×N optical signals.

The first data is set in the problem loading module, and the first data is applied to the two-dimensional optical signal matrix, to generate a feedback signal matrix.

The following uses an example in which the first signal processing module receives the spin signal group E to describe a manner in which the signal processing module converts the group of one-dimensional spin signals into the two-dimensional optical signal matrix.

After receiving the spin signal group E, the first signal processing module may perform shaping and collimation on each spin signal in the spin signal group E, so that the spin signals in the spin signal group are transmitted in parallel, and no crosstalk occurs. The shaping and collimation of the signal may be implemented by a micromirror array, or may be implemented by another optical component. This is not limited in this embodiment of this application.

The first information processing module splits the parallel spin signals on a transmission plane of the spin signals. Each spin signal is split into N same spin signals, and the N spin signals are split to form N columns of spin signals. Each column of spin signals includes N spin signals, and the N spin signals in each column are the same, to form an N×N optical signal matrix. Splitting of the spin signal may be implemented by a cylindrical mirror, or may be implemented by another optical component. This is not limited in this embodiment of this application.

Figure 8A:
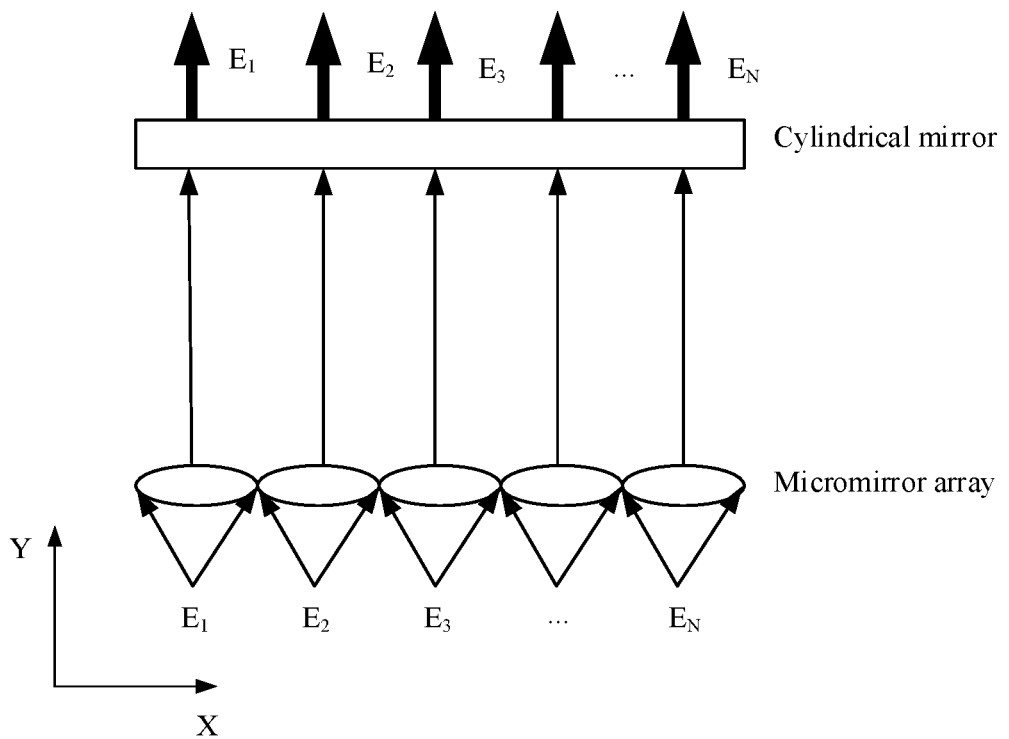
FIG. 8A is a flowchart of processing a spin signal group E by a first signal processing module on an XY plane according to this application.

The following provides description with reference to figures. FIG. 8A is a flowchart of processing the spin signal group E by the first signal processing module on an XY plane. The spin signals ($E_1, E_2, E_3 \ldots,$ and $E_N$) in the spin signal group E are collimated by using the micromirror array, to form N parallel spin signals, and the N parallel spin signals form N columns of spin signals after passing through the cylinder mirror. A plane formed by each column of spin signals is perpendicular to the XY plane and parallel to an YZ plane.

Figures 8B, 9:
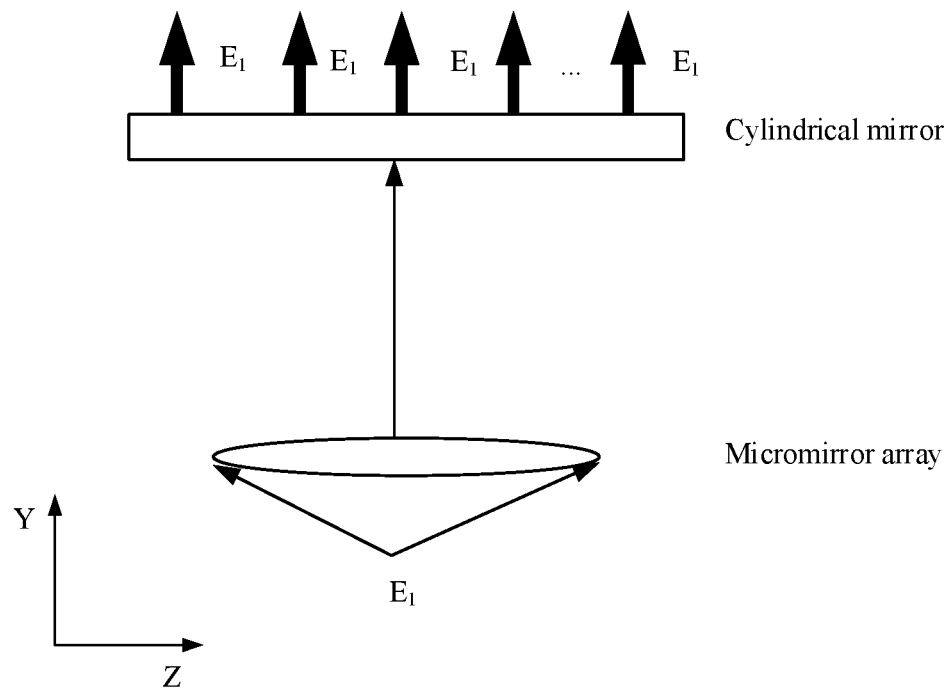
FIG. 8B is a flowchart of processing a spin signal $E_1$ by a first signal processing module on a YZ plane according to this application.
FIG. 9 is a schematic diagram of an optical signal matrix generated by a first signal processing module according to this application.

FIG. 8B is a flowchart of processing a spin signal by the first signal processing module on the YX plane.

A spin signal (for example, $E_1$) in the spin signal group E is collimated by using the micromirror array; and forms N spin signal $E_1$ after passing through the cylindrical mirror.

FIG. 9 shows an optical signal matrix generated by the first signal processing module. A size of the optical signal matrix is N×N, and an optical signal in each column is the same as a spin signal in the spin signal group E.

To better implement the collimation and splitting of the spin signal, the first spin array 100 may be located on a focal plane of the cylindrical mirror and the micromirror array in the first signal processing module.

The following describes a signal processing procedure performed by the problem loading module by using an example in which the problem loading module receives the optical signal matrix shown in FIG. 9 and generates a feedback signal matrix.

In this structure, the first data set in the problem loading module may be abstracted as a two-dimensional interaction matrix. The two-dimensional interaction matrix may be implemented by a spatial light modulator, and an optical phase or intensity of an optical signal is modulated by using the spatial light modulator. To be specific, an element in the two-dimensional interaction matrix indicates a degree to which the spatial light modulator modulates an optical phase or intensity of a signal in the signal matrix.

The two-dimensional interaction matrix may alternatively be implemented by a digital micromirror array, and light intensity of an optical signal is modulated by using the digital micromirror array. To be specific, an element in the two-dimensional interaction matrix indicates a degree to which the digital micromirror array modulates an optical phase or intensity of a signal in the signal matrix.

The two-dimensional interaction matrix is a symmetric matrix, and an element on a diagonal is not zero.

As shown in FIG. 10, the signal processing procedure performed by the problem loading module may be abstracted as a matrix operation, and the feedback signal matrix is generated by using the optical signal matrix generated by the first signal processing module and the two-dimensional matrix.

An optical signal in the optical signal matrix interacts with an element at a corresponding position in the two-dimensional matrix, to generate a signal at a corresponding position in the feedback signal matrix. For example, an optical signal $E_1$ in the first row in the optical signal matrix interacts with an element $a_{1,1z}$ in the first row and the first column in the two-dimensional matrix to generate a signal $a_{1,1}E_1$ at a corresponding position in the feedback signal matrix.

The following uses an example in which the second signal processing module outputs the feedback signal group fA to describe a manner in which the signal processing module converts the two-dimensional feedback signal matrix into a group of feedback signals.

Figures 11, 12A:
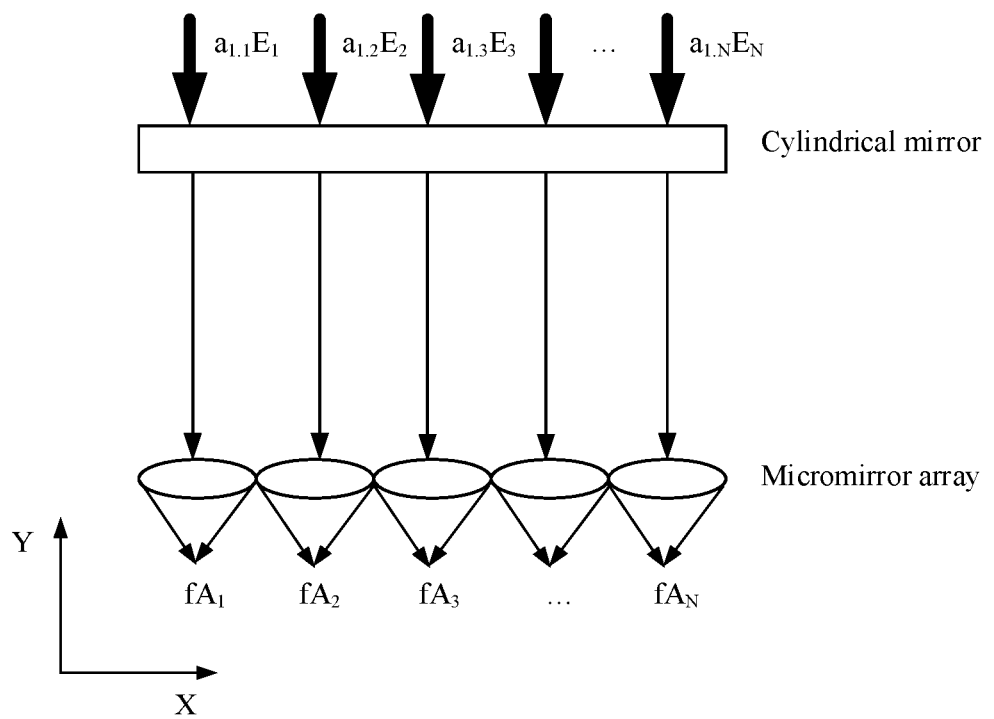
FIG. 11 is a schematic diagram of a feedback signal matrix according to this application.
FIG. 12A is a flowchart of processing a feedback signal matrix by a second signal processing module on an XY plane according to this application.

FIG. 11 shows a feedback signal matrix received by the second signal processing module from the optical feedback network 300. A size of the feedback signal matrix is N×N, and an optical signal in the matrix may be considered as a product of a spin signal in the spin signal group E and an element in the two-dimensional matrix.

After receiving the feedback signal matrix, the second signal processing module may combine signals in each column of the feedback signal matrix into one feedback signal. For the feedback signal matrix of N×N columns, N feedback signals may be formed after combination. After signals in a column in the feedback signal matrix are combined, one feedback signal may be generated, that is, a feedback signal $fA_1=\Sigma_{1<i<N}a_{i,1}\Sigma_1$, a feedback signal $fA_2=\Sigma_{1<i<N}a_{i,2}E_2$, a feedback signal $fA_3=\Sigma_{1<i<N}a_{i,3}E_3$, and a feedback signal $fA_N=\Sigma_{1<i<N}a_{i,N}E_N$. A signal combination procedure and a signal splitting procedure are inverse to each other. Optical signal combination may be implemented by the cylindrical mirror, or may be implemented by another optical component. This is not limited in this embodiment of this application.

Then, the second signal processing module may perform shaping and collimation on each of the N feedback signals, so that the feedback signals in the feedback signal group fA are transmitted in parallel, and no crosstalk occurs. The shaping and collimation of the signal may be implemented by the micromirror array, or may be implemented by another optical component. This is not limited in this embodiment of this application.

The following provides description with reference to figures. FIG. 12A is a flowchart of processing the feedback signal matrix by the second signal processing module on the XY plane. N columns of feedback signals in the feedback signal matrix form N feedback signals after passing through the cylindrical mirror, and the N feedback signals are collimated after passing through the micromirror array, to form N parallel feedback signals.

Figure 12B:
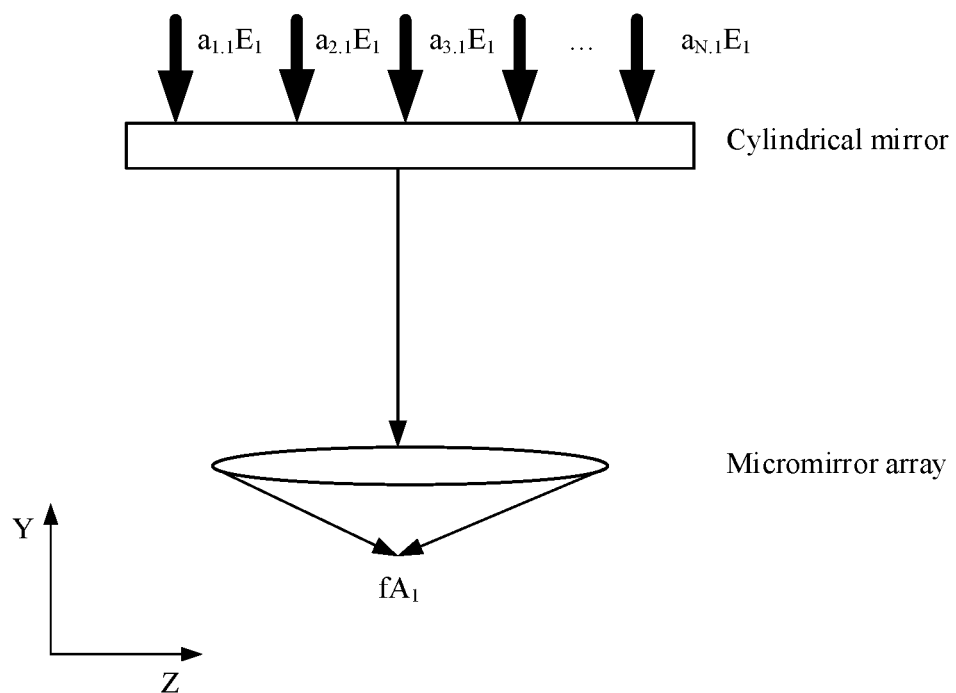
FIG. 12B is a flowchart of processing a column of signals in a feedback signal matrix by a first signal processing module on a YZ plane according to this application.

FIG. 12B is a flowchart of processing a column of signals in the feedback signal matrix by the second signal processing module on the YX plane. The column of feedback signals are combined after passing through the cylindrical mirror, to form a feedback signal, and then the feedback signal is collimated after passing through the micromirror array.

To better implement the collimation and combination of the feedback signals, the second spin array 200 may be located on a focal plane of the cylindrical mirror and the micromirror array in the second signal processing module.

The second signal processing module forms the N feedback signals, and separately transmits the N feedback signals to each optical parametric oscillator in the second spin array 200, and each optical parametric oscillator receives one feedback signal.

The feedback signal received by each optical parametric oscillator in the second spin array 200 is generated after a spin signal output by a corresponding optical parametric oscillator in the first spin array 100 is processed by the optical feedback network 300. For example, a spin signal output by an optical parametric oscillator in the first spin array 100 is $E_1$, and a feedback signal received from the optical feedback network 300 by a corresponding optical parametric oscillator in the second spin array 200 is $fA_1=\Sigma_{1<i<N}a_{i,1}E_1$. A spin signal output by an optical parametric oscillator in the first spin array 100 is $E_2$, and a feedback signal received from the optical feedback network 300 by a corresponding optical parametric oscillator in the second spin array 200 is $fA_1=\Sigma_{1<i<N}a_{i,1}E_2$.

Figure 13:
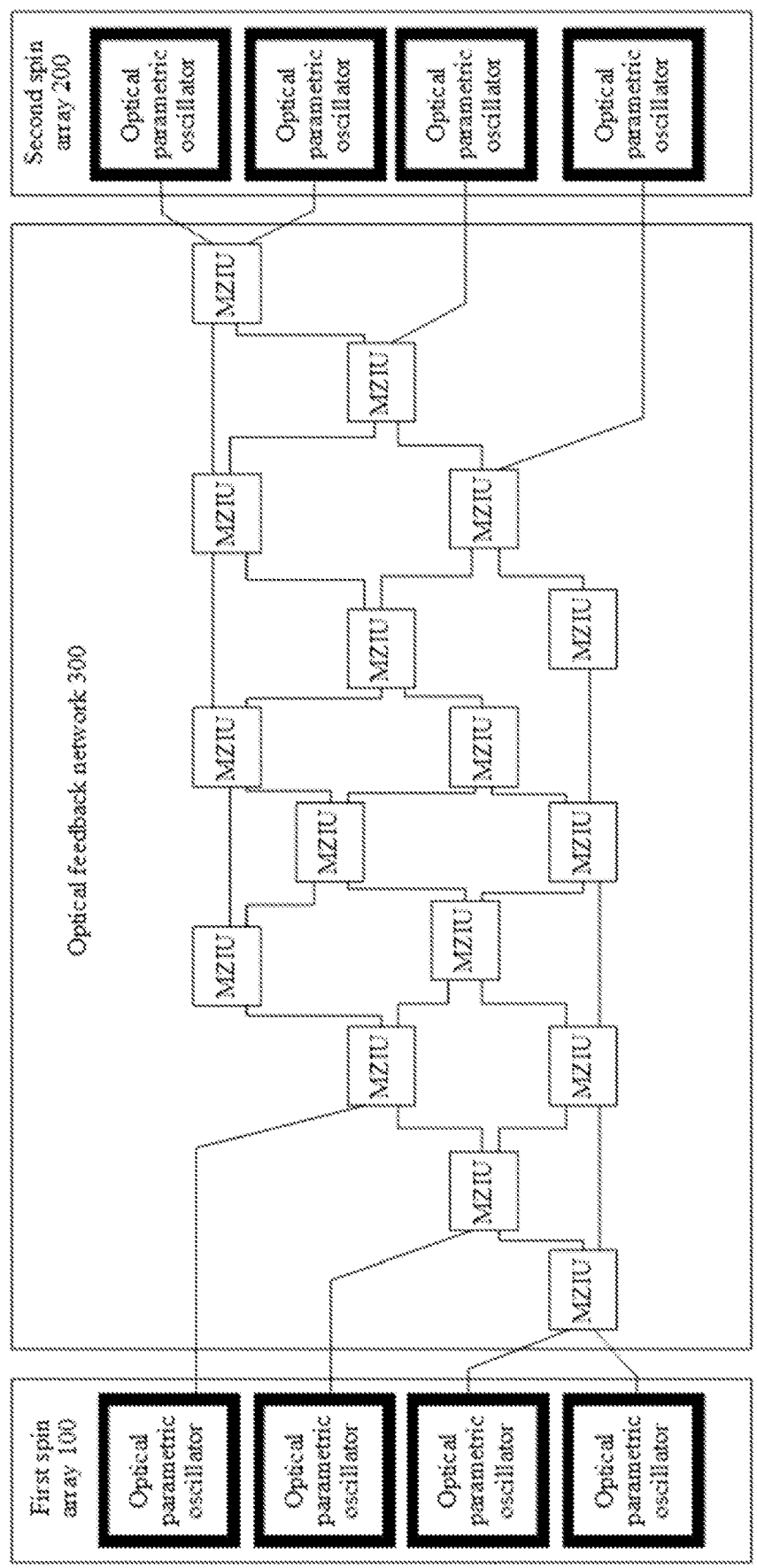
FIG. 13 is a schematic diagram of a structure of an optical computing device according to this application.

FIG. 13 is a schematic diagram of a structure of another optical computing device according to an embodiment of the present invention. For example, FIG. 13 is a schematic diagram of a structure of an optical feedback network 300 in which a first spin array 100 and a second spin array 200 each include four optical parametric oscillators. The optical feedback network 300 includes a plurality of cascaded Mach-Zehnder interferometer units (MZIU). Each MZIU may receive two channels of optical signals, and each MZIU includes a plurality of Mach-Zehnder interferometers (MZI) and optical switches that are disposed at an interval.

A size of the Mach-Zehnder interferometer is small, so that the optical computing device is more compact in structure and can be implemented on a chip, to ensure system stability.

In this embodiment of this application, the MZI is configured to implement mutual interference between the two input channels of optical signals, and corresponding output signals are controlled by the MZI by using a phase parameter of the MZI. The optical switch in each MZIU may adjust transmission paths of optical signals from different directions (namely, optical signals whose transmission directions are from the first spin array 100 to the second spin array 200 and from the second spin array 200 to the first spin array 100).

The phase parameters of the MZIs included in the MZIUs may be different. Positions of the optical switches and the MZIs with the different phase parameters in the MZIU are controlled, so that the optical signals from different directions pass through a same quantity of MZIs, and pass through the MZIs with different phase parameters in a same sequence. For example, the MZIs are disposed in the MZIU in a left-right symmetrical manner in the transmission directions of the optical signals, and phase parameters of two MZIs at left-right symmetrical positions are the same.

Figure 14:
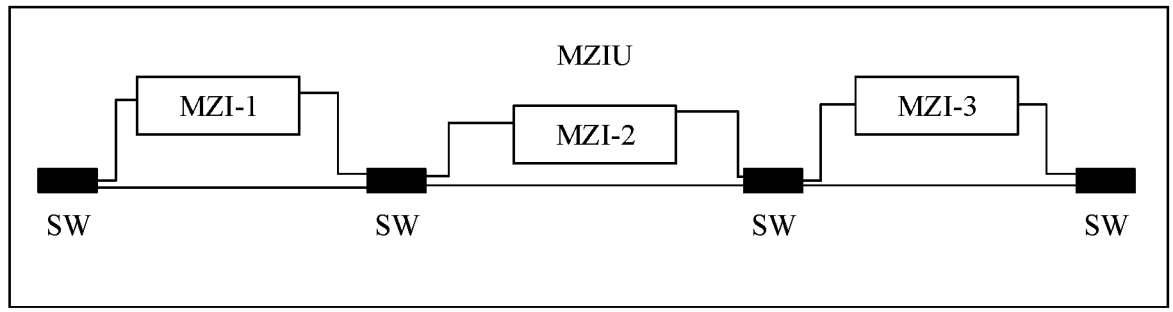
FIG. 14 is a schematic diagram of a structure of an MZIU according to this application.

The following describes a structure of an MZIU according to an embodiment of this application. As shown in FIG. 14, the MZIU includes three MZIs (which are respectively MZI-1. MZI-2, and MZI-3) and four optical switches. In FIG. 14, the optical switch is denoted by SW, and phase parameters of MZIs on the left and right sides of the MZIU are the same. Phase parameters of MZI-1 and MZI-3 are $\phi_i$, and a phase parameter of MZI-2 is $\theta_i$.

By controlling the optical switches, an optical signal received from the first spin array 100 and an optical signal received from the second spin array 200 may have different transmission paths, but pass through a same quantity of MZIs, and pass through the MZIs with different phase parameters in a same sequence.

Figure 15A:
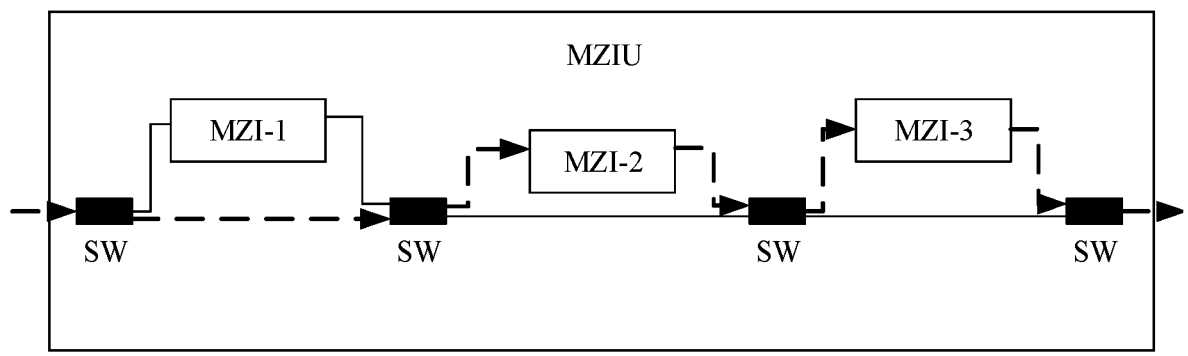
FIG. 15A is a schematic diagram of a transmission path of a signal in an MZIU according to this application.

For example, FIG. 15A shows the transmission path, in the MZIU, of the optical signal whose transmission direction is from the first spin array 100 to the second spin array 200. The optical signal passes through the MZI-2 with the phase parameter $\theta_i$ and the MZI-3 with the phase parameter $\phi_i$.

Figure 15B:
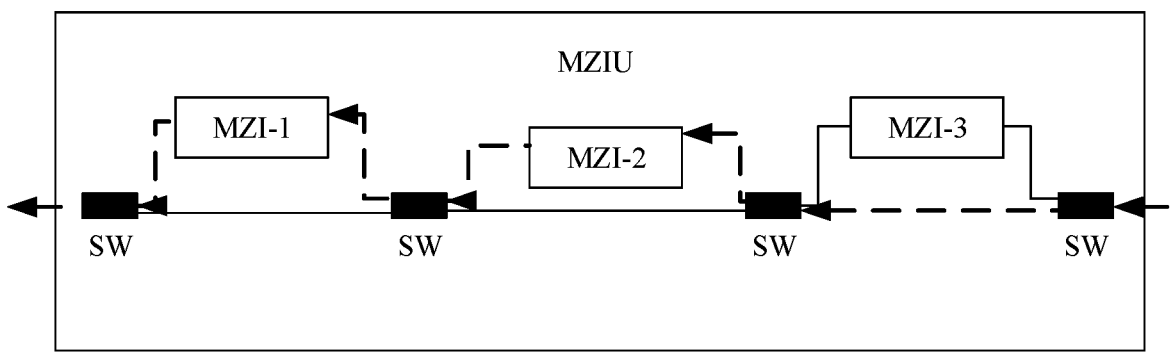
FIG. 15B is a schematic diagram of a transmission path of a signal in another MZIU according to this application.

FIG. 15B shows the transmission path, in the MZIU, of the optical signal whose transmission direction is from the second spin array 200 to the first spin array 100. The optical signal passes through the MZI-2 with the phase parameter $\theta_i$ and the MZI-1 with the phase parameter $\phi_i$.

A manner of cascading the plurality of MZIUs included in the optical feedback network 300 is not limited in this embodiment of this application, provided that a structure $UDU^+$ can be formed by the plurality of MZIUs, where U is a unitary matrix, $U^+$ is a transposed matrix of U, and D is a diagonal matrix.

First data in the optical feedback network 300 is the phase parameters of the MZIs in the cascaded plurality of MZIUs.

Figure 16:
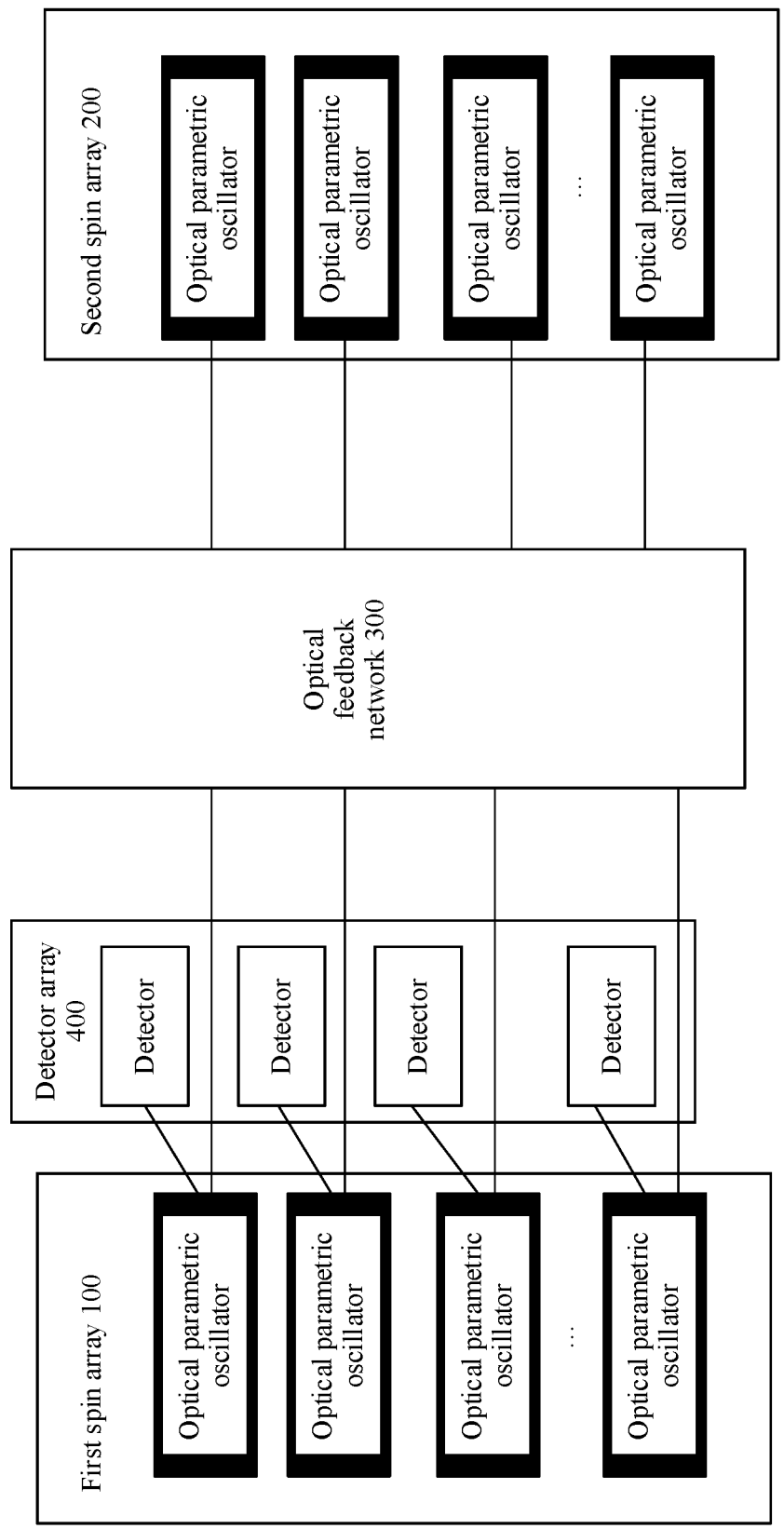
FIG. 16 is a schematic diagram of a structure of an optical computing device according to this application.

As shown in FIG. 16, the optical computing device provided in this embodiment of this application further includes a detector array 400. The detector array 400 may be connected to any spin array, detect a group of spin arrays output by the spin array, and determine a phase of each spin signal included in the group of spin signals. When an optical power of an optical pulse received by the spin array reaches a specified value, the phase of each spin signal may Stochastically collapse to 0 or π. When the phase of each spin signal collapses to 0 or π, it is considered that the currently output group of spin signals corresponds to the first data, and a final computation result may be determined based on the group of spin signals.

In FIG. 16, for example, the detector array 400 is connected to the first spin array 100. The detector array 400 may include N detectors, each detector is connected to one optical parametric oscillator in the first spin array 100, and the detectors are connected to different optical parametric oscillators. Each detector may detect a phase of a spin signal generated by the connected optical parametric oscillator. When the detector array 400 detects that the phase of each spin signal output by the first spin array 100 collapses to 0 or π, the final computation result is determined based on the group of spin signals.

Figure 17:
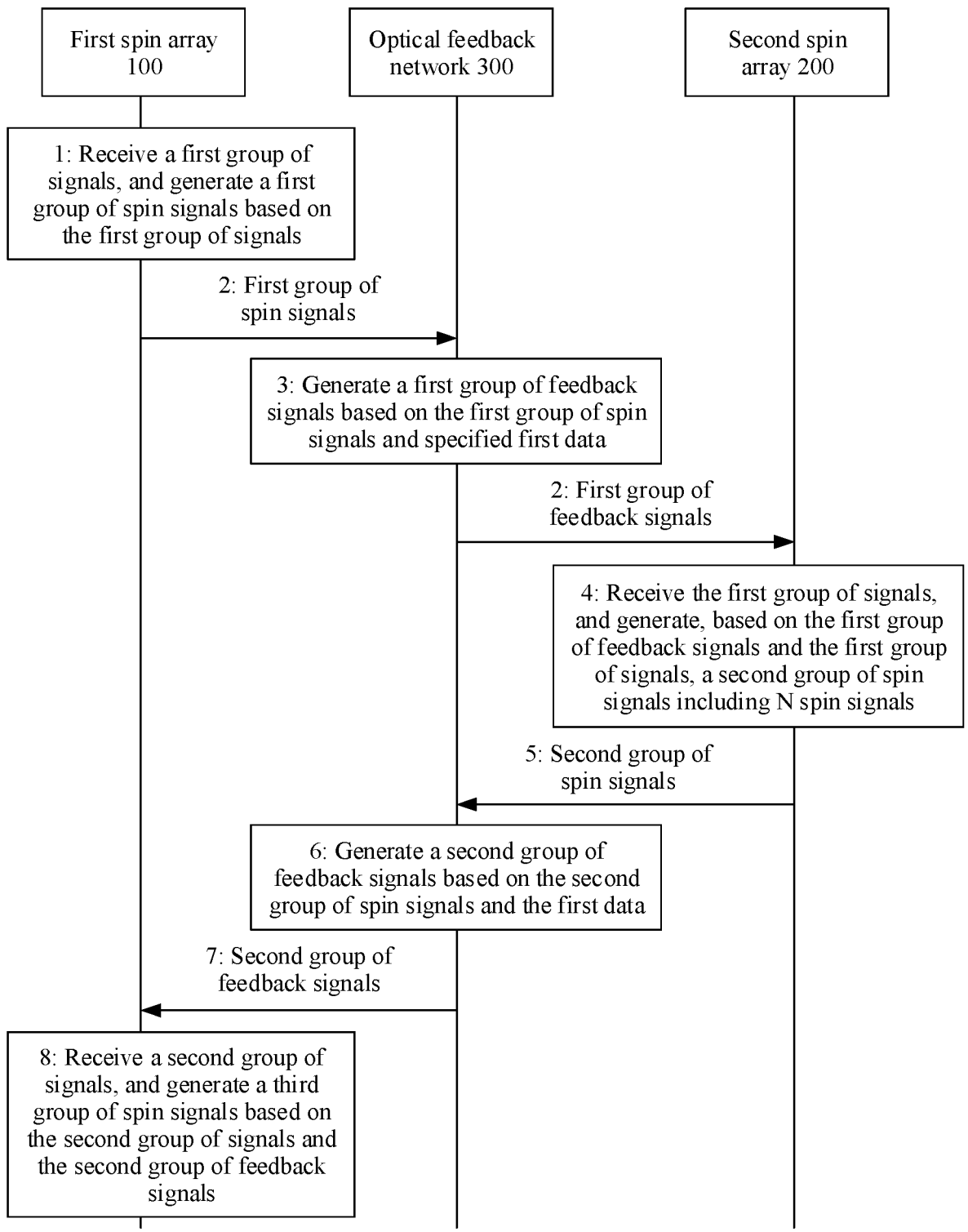
FIG. 17 is a schematic diagram of a computing method according to this application

To make solution description clearer, the following briefly describes, with reference to the foregoing embodiments, a working procedure of the optical computing device provided in the embodiments of the present invention by using the optical computing device shown in FIG. 16 and a computing method shown in FIG. 17 as examples. FIG. 16 shows another optical computing device according to an embodiment of the present invention. It should be noted that the following description of the working procedure is also applicable to all the optical computing devices described above. As shown in FIG. 16 and FIG. 17, in the working procedure, the first spin array 100 may receive a first group of signals including N signals (for example, the optical pulse group A in the embodiments of this application), and generate, based on the first group of signals, a first group of spin signals including N spin signals (for example, the spin signal group E in the embodiments of this application), where N is a positive integer greater than 2. The optical feedback network 300 may receive the first group of spin signals, and generate, based on the first group of spin signals and specified first data, a first group of feedback signals including N feedback signals (for example, the feedback signal group fA in the embodiments of this application). It may be understood that the signal transmission procedure from the first spin array 100 to the optical feedback network 300 described herein is similar to the procedure 1 in the foregoing embodiment. After the optical feedback network 300 generates the first group of feedback signals, the second spin array 200 may receive the first group of feedback signals (for example, the feedback signal group fA in the embodiments of this application) and the first group of signals (for example, the optical pulse group A in the embodiments of this application). Further, the second spin array 200 may generate, based on the first group of feedback signals and the first group of signals, a second group of spin signals including N spin signals (for example, the spin signal group F in the embodiments of this application). The optical feedback network 300 receives the second group of spin signals, and generates, based on the second group of spin signals and the first data, a second group of feedback signals including N feedback signals (for example, the feedback signal group fB in the embodiments of this application). The signal transmission procedure from the second spin array 200 to the optical feedback network 300 is similar to the procedure 2 in the foregoing embodiment.

It may be understood that, in actual application, the procedure 1 and the procedure 2 may further be performed for a plurality of times. For example, the first spin array 100 may further receive the second group of feedback signals and a second group of signals including N signals (for example, the optical pulse group A' in the embodiments of this application), and generate, based on the second group of feedback signals and the second group of signals, a third group of spin signals including N spin signals (for example, the spin signal group P in the embodiments of this application). Then, the optical feedback network 300 receives the third group of spin signals, generates a new group of feedback signals based on the received third group of spin signals, and sends the newly generated group of feedback signals to the second spin array 200. The second spin array 200 then generates a group of spin signals based on the received feedback signals and the second group of signals, and transmits the group of spin signals to the optical feedback network 300. The optical feedback network 300 receives the group of spin signals, generates a group of feedback signals again based on the spin signals received from the second spin array, and feeds back the group of feedback signals to the first spin array 100. This process repeats until the detector array 400 detects that a phase of each spin signal output by the first spin array 100 collapses to 0 or π.

According to the optical computing device provided in the embodiments of the present invention, because procedures in which the first spin array and the second spin array process N optical pulses in a group of optical pulses are parallel, operation time of the optical computing device is not increased when a quantity of optical pulses is increased, and computation efficiency of the optical computing device can be effectively improved. Further, the structure of the optical computing device provided in the embodiments of the present invention is simple, and interaction is implemented through mutual injection and coupling of the two spin arrays, so that an architecture of an optical Ising machine is greatly simplified, and integration of an all-optical Ising machine on a chip is possibly implemented. Further, because the optical feedback network is an all-optical feedback network, the optical-to-electrical conversion is not required, and parallel search of spin configurations is implemented. This greatly shortens computation time, improves system stability, and improves computation efficiency of the optical computing device. Further, in the computation procedure, an injected signal for photoelectric detection is not required, thereby shortening a signal transmission time period.

It may be understood that, in actual application, the first spin array and the second spin array in the embodiments of the present invention may not be limited to spin arrays that can generate an optical pulse, and may alternatively be two spin arrays mapped in another manner, for example, laser arrays formed by lasers, and polaron arrays formed by polarons.

In addition, the optical computing device provided in the embodiments of the present invention has the simple structure, and can be implemented on the chip. Further, the entire computation procedure is implemented in a manner of an optical signal, a signal transmission speed is high, and a computation speed is also greatly improved. Therefore, the optical computing device provided in the embodiments of the present invention may be used in a neural network system, for example, may be configured to implement feedback control in the neural network system.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, refer to related descriptions in another embodiment. The embodiments of the present invention, claims, and features disclosed in the accompanying drawings may exist independently, or exist in a combination. Features described in a hardware form in the embodiments of the present invention may be executed by software, and vice versa. This is not limited herein.

What is claimed is:

1. An optical computing device comprising:
   a first spin array, configured to receive a first group of signals, and generate a first group of spin signals based on the first group of signals, wherein the first group of spin signals comprises N spin signals, and N is an integer not less than 2;
   an optical feedback network, connected to the first spin array and configured to:
   receive the first group of spin signals; and
   generate a first group of feedback signals based on the first group of spin signals and specified first data, wherein the first group of feedback signals comprises N feedback signals; and
   a second spin array, connected to the optical feedback network and configured to:
   receive the first group of feedback signals and the first group of signals; and
   generate a second group of spin signals based on the first group of feedback signals and the first group of signals, wherein the second group of spin signals comprises N spin signals.

2. The device according to claim 1, wherein the optical feedback network is further configured to:
   receive the second group of spin signals; and
   generate a second group of feedback signals based on the second group of spin signals and the first data, wherein the second group of feedback signals comprises N feedback signals; and
   the first spin array is further configured to:
   receive the second group of feedback signals and a second group of signals, wherein a second group of optical pulses comprises N optical pulses, and an amplitude of the second group of optical pulses is greater than an amplitude of a first group of optical pulses; and
   generate a third group of spin signals based on the second group of feedback signals and the second group of signals, wherein the third group of spin signals comprises N spin signals.

3. The device according to claim 1, wherein the first spin array comprises N optical parametric oscillators, and each optical parametric oscillator in the first spin array is configured to receive one of the first group of signals.

4. The device according to claim 1, wherein the second spin array comprises N optical parametric oscillators, each optical parametric oscillator in the second spin array is configured to receive one of the first group of signals and one of the first group of feedback signals, the N optical parametric oscillators in the second spin array are in a one-to-one correspondence with the N optical parametric oscillators in the first spin array, and signals received by optical parametric oscillators having a correspondence in the second spin array and the first spin array are the same.

5. The device according to claim 1, wherein the optical feedback network comprises:
   a first signal processor, configured to receive the first group of spin signals, and convert the first group of spin signals into a first optical signal matrix, wherein the first optical signal matrix comprises N×N optical pulses;
   a problem loader, connected to the first signal processor and configured to generate a first feedback signal matrix based on the first optical signal matrix and the first data, wherein the first feedback signal matrix comprises N×N optical signals; and a second signal processor, connected to the problem loader and configured to convert the first feedback signal matrix into the first group of feedback signals.

6. The device according to claim 5, wherein
the second signal processor is further configured to receive the second group of spin signals, and convert the second group of spin signals into a second optical signal matrix, wherein the second optical signal matrix comprises N×N optical pulses:

the problem loader is further configured to generate a second feedback signal matrix based on the second optical signal matrix and the first data, wherein the second feedback signal matrix comprises N×N optical signals; and the first signal processor is further configured to convert the second feedback signal matrix into the second group of feedback signals.

7. The device according to claim 1, wherein the optical feedback network comprises a plurality of cascaded Mach-Zehnder (MZ) interferometer component, and each MZ interferometer component comprises a Mach-Zehnder interferometer and an optical switch disposed at an interval.

8. The device according to claim 1, wherein the optical computing device further comprises:

a detector array, connected to the first spin array and configured to:

detect the third group of spin signals; and
in response to phases of the third group of spin signals being preset values, obtain a computation result of the first data based on the third group of spin signals.

9. The device according to claim 2, wherein the first group of signals comprises the first group of optical pulses, the second group of signals comprises the second group of optical pulses, and the amplitude of the second group of optical pulses is greater than the amplitude of the first group of optical pulses.

10. A computing method, wherein the method is performed by an optical computing device: the optical computing device comprises a first spin array, a second spin array, and an optical feedback network separately connected to the first spin array and the second spin array; and the method comprises:

receiving, by the first spin array, a first group of signals, and generating a first group of spin signals based on the first group of signals, wherein the first group of spin signals comprises N spin signals, and N is an integer not less than 2;

generating, by the optical feedback network, a first group of feedback signals based on the first group of spin signals and specified first data, wherein the first group of feedback signals comprises N feedback signals; and receiving, by the second spin array, the first group of signals and the first group of feedback signals, and generating a second group of spin signals based on the first group of feedback signals and the first group of signals, wherein the second group of spin signals comprises N spin signals.

11. The method according to claim 10, further comprising:

receiving, by the optical feedback network, the second group of spin signals sent by the second spin array;
generating, by the optical feedback network, a second group of feedback signals based on the second group of spin signals and the first data, wherein the second group of feedback signals comprises N feedback signals;

receiving, by the first spin array, a second group of signals; and generating, by the first spin array, a third group of spin signals based on the second group of feedback signals and the second group of signals, wherein the third group of spin signals comprises N spin signals.

12. The method according to claim 11, wherein the optical computing device further comprises a detector array, and the method further comprises:

detecting, by the detector array, the third group of spin signals; and in response to phases of the third group of spin signals being preset values, obtaining a computation result of the first data based on the third group of spin signals.

13. The method according to claim 10, wherein the receiving; the first group of signals comprises:

receiving, by each optical parametric oscillator in the first spin array, one of the first group of signals, wherein the first spin array comprises N optical parametric oscillators.

14. The method according to claim 13, wherein the second spin array comprises N optical parametric oscillators; and the receiving the first group of signals and the first group of feedback signals comprises:

receiving, by each optical parametric oscillator in the second spin array, one of the first group of signals and one of the first group of feedback signals, wherein the N optical parametric oscillators in the second spin array are in a one-to-one correspondence with the N optical parametric oscillators in the first spin array, and signals received by optical parametric oscillators having a correspondence in the second spin array and the first spin array are the same.

15. The method according to claim 10, further comprising:

receiving, the first group of spin signals, and converting the first group of spin signals into a first optical signal matrix, wherein the first optical signal matrix comprises N×N optical pulses;

generating a first feedback signal matrix based on the first optical signal matrix and the first data, wherein the first feedback signal matrix comprises N×N optical signals; and converting the first feedback signal matrix into the first group of feedback signals.

16. The method according to claim 15, further comprising:

receiving the second group of spin signals, and converting the second group of spin signals into a second optical signal matrix, wherein the second optical signal matrix comprises N×N optical pulses;

generating a second feedback signal matrix based on the second optical signal matrix and the first data, wherein the second feedback signal matrix comprises N×N optical signals; and converting the second feedback signal matrix into the second group of feedback signals.

17. The method according to claim 11, wherein the first group of signals comprises the first group of optical pulses, the second group of signals comprises the second group of optical pulses, and the amplitude of the second group of optical pulses is greater than the amplitude of the first group of optical pulses.

* * * * *

UNITED STATES PATENT AND TRADEMARK OFFICE
CERTIFICATE OF CORRECTION

Page 1 of 1

PATENT NO. : 12,181,909 B2
APPLICATION NO. : 17/691945
DATED : December 31, 2024
INVENTOR(S) : Yun et al.

It is certified that error appears in the above-identified patent and that said Letters Patent is hereby corrected as shown below:

In the Claims

Claim 1: Column 20, Line 11: "integer not less than 2:" should read as -- integer not less than 2; --.

Claim 5: Column 20, Line 64: "pulses:" should read as -- pulses; --.

Claim 6: Column 21, Line 11: "comprises N × N optical pulses:" should read as -- comprises N × N optical pulses; --.

Claim 10: Column 21, Line 40: "formed by an optical computing device: the optical com-" should read as -- formed by an optical computing device; the optical com- --.

Claim 13: Column 22, Line 18: "receiving; the first group of signals comprises:" should read as -- receiving the first group of signals comprises: --.

Signed and Sealed this
Seventeenth Day of June, 2025

Coke Morgan Stewart
*Acting Director of the United States Patent and Trademark Office*